United States Patent
Kadziela et al.

(12)

(10) Patent No.: US 6,503,960 B1
(45) Date of Patent: Jan. 7, 2003

(54) DISPERSION STABLE CURABLE COMPOSITIONS AND METHOD FOR MAKING HOLLOW SHELLS USING SAME

(75) Inventors: Vic K. Kadziela, New Britain, CT (US); Alan E. Litke, Waterbury, CT (US)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/999,236

(22) Filed: Nov. 1, 2001

Related U.S. Application Data

(60) Provisional application No. 60/252,272, filed on Nov. 21, 2000.

(51) Int. Cl.$^7$ ................................................ C08G 18/67
(52) U.S. Cl. ............................. 522/78; 522/97; 264/22
(58) Field of Search ........................ 522/97, 78; 264/22

(56) References Cited

U.S. PATENT DOCUMENTS 4,314,924 A    2/1982  Haubennestel et al.
5,763,503 A    6/1998  Cowperthwaite et al.
5,908,873 A    6/1999  Shustack

FOREIGN PATENT DOCUMENTS

JP    10-130601    5/1998
JP    10-130602    5/1998

*Primary Examiner*—Rachel Gorr
(74) *Attorney, Agent, or Firm*—Hoffmann & Baron LLP

(57) ABSTRACT

A curable composition and method for making hollow shell molds, such as those employed to make hearing aids. The curable composition includes a (meth)acryl functionalized curable component, a cure system, a pigment composition, and a dispersion stabilizing additive. The pigment composition includes at least one pigment disbursed within the curable composition. The dispersion additive maintains the pigment in a disbursed form prior to cure. The dispersion additive includes an alkali metal cation and a reaction product.

27 Claims, No Drawings

DISPERSION STABLE CURABLE COMPOSITIONS AND METHOD FOR MAKING HOLLOW SHELLS USING SAME

This application claims the benefit of U.S. Provisional Application No. 60/252,272, filed on Nov. 21, 2000.

FIELD OF THE INVENTION

The present invention relates to curable compositions which include a pigment disbursed therein and a dispersion stabilizing additive which maintains the pigment in a disbursed form prior to cure. In particular, the curable compositions of the present invention are radiation curable compositions which have particular application for use in hollow shell molds, such as those employed to make hearing aids.

BACKGROUND OF RELATED TECHNOLOGY

Curable (meth)acryl functionalized compositions have been use for the manufacture of hollow molded articles, and in particular articles such as hearing aids. Such compositions are ordinarily radiation curable due to the manufacturing efficiencies and cost savings as compared to using heat to cure. Additionally, ultraviolet and/or visible light can be employed to concentrate or direct the curing energy at a particular portion of the curable composition and to ensure the proper irradiation.

For example, U.S. Pat. No. 5,763,503 to Cowperthwaite, discloses a method for making hollow shells, i.e. housings for in-ear hearing aids, using a radiation curable composition. This patent discloses the use of a hydroxyalkylmethacrylate-capped component, a difunctional, urethane methacrylate monomer, a minor amount of unreacted hydroxalkyl($C_{2-3}$) methacrylate monomer and a photoiniator. This composition is described as being pourable and contains a viscosity-increasing amount of viscosity-increasing solid other than a colorant. This patent focuses on controlling and adjusting the viscosity of the composition to achieve formulations which produce better hollow-shelled articles. The presence of viscosity-affecting ingredients, including pigments, is described as being carefully limited.

Other (meth)acrylate-based curable compositions have used a combination of uv curable components to achieve the desired cure properties. For example, Japanese Laid-Open Patent Publication Nos. 10-130601 and 10-130602 reportedly assigned to Nippon Kayakuco, Ltd., disclose uv curing adhesive compositions for use as protective coatings on optical discs which employ a uv curable ethylenically compound, such as a (meth)acrylate compound, a photoinitiator, an organic peroxide and an amino accelerator compound. Among the disclosed curable compounds are 2-hydroxyethyl (meth)acrylate, benzyl (meth)acrylate, isobornyl (meth)acrylate and phenyl oxyethyl (meth) acrylate. Another example of a uv curing (meth)acrylate-based composition is disclosed in U.S. Pat. No. 5,908,873, which contains an aliphatic urethane acrylate oligomer, a reactive (meth)acrylate monomer, a release agent and a photoinitiator. This composition is used to affix coated and inked optical fibers in a ribbon configuration.

Using colorants, such as dyes and pigments, in (meth) acryl functionalized curable compositions has been used for visual inspection purposes, as well as providing color to the cured product to meet the demands of the particular application. Many colorants do not stay suspended or uniformly distributed in curable resin compositions for long periods of times, such as when subjected to storage conditions. For this reason, mixing to disburse and/or uniformly distribute the colorants throughout the resin composition is generally required to obtain the desired color upon cure. This additional mixing step is undesirable in production processes because it is costly, can be technician sensitive and may require the use of the mixed composition within a relatively short time period.

Moreover, if mixing of the colorant into the curable composition immediately prior to use is required, uniform dispersion often does not occur due to agglomeration which forms during storage.

One particular commercial area where these problems exist is in the manufacturing and repair of custom hearing aids. In this industry, a variety of different types of flesh tones must be closely matched, typically using low concentrations of pigments which have been chosen to produce a variety of industry standard colors and which allow for tailoring of the curable composition to a particular person's skin. For the most part, these pigments are insoluble particles which tend to fall out of dispersion as sediment, due to their density. Compositions used in molding hollow shell articles, such as hearing aids, generally require relatively low viscosities in order to easily dispense and process the compositions into the final molded article. Low viscosity materials further accelerate the sedimentation of conventional pigments, and in particular the more commonly heavy pigments such as $TiO_2$ and $Fe_2O_3$.

Efforts to use various filler materials such as silica to provide thixotropic character to pigmented compositions useful in the production of hollow shell articles, such as hearing aids, has been largely unsuccessful due to the resulting surface blemishes and loss of other aesthetic features upon cure. Moreover, these filled compositions were not readily pourable due to the addition of the fillers, causing additional difficulties during manufacturing.

Thus, there is a need for a curable composition which can be effectively used to make cured articles, such as hearing aides and other hollow shell products, which can incorporate a variety of colorants, and in particular solid pigments, and which can be formulated into pourable and relatively low viscosity compositions which do not require substantial mixing prior to use in order to uniformly disburse the colorant therein. Moreover, there is a need for a (meth)acryl functionalized composition, which can cure by a variety of mechanisms, including electromagnetic radiation, and which can be molded into hearing aids and other high quality finished products having precise skin tone matches and coloring.

SUMMARY OF THE INVENTION

The present invention relates to curable compositions which include:

(a) a (meth)acryl functionalized curable component useful as a matrix, (b) a cure system for said curable component;

(c) a pigment composition comprising of at least one pigment disbursed within said curable component; and (d) an additive which comprises an alkali metal cation and the reaction product of:

(i) a polyfunctional isocyanate and a member selected from an hydroxy and an amine; or (ii) a phosgene or phosgene derivative and a compound having 3 to 7 polyethylene glycol ether units terminated at one end with an ether group and the other end with a reactive functional group selected from an amine, an amide, a thiol and an alcohol; or (iii) a monohydroxy compound, a diisocyanate and a polyamine.

In another aspect of the present invention, there is included a composition useful for the manufacture of hollow shells, such as hearing aids, which includes:

a. a photocurable aliphatic urethane-acrylate oligomer matrix composition having disbursed therein a pigment and a dispersion stabilizer, said stabilizer comprising an alkali metal salt and an additive which is the reaction product of:
   (i) a polyfunctional isocyanate and a member selected from an hydroxy and an amine; or
   (ii) a phosgene or phosgene derivative and a compound having 3 to 7 polyethylene glycol ether units terminated at one end with an ether group and the other end with a reactive functional group selected from an amine, an amide, a thiol and an alcohol; or
   (iii) a monohydroxy compound, a diisocyanate and a polyamine; and
b. a photoiniator.

The curable compositions of the present invention provide the ability to make hollow shell articles, such as hearing aids, having a substantially uniform cross-sectional thickness. Such control is due to the unique curable compositions and the ability to control the radiation exposure used to cure the compositions. Pigments used in the present invention are present in amounts sufficient to produce the desired color of the final article, without interfering with the radiation curing or final properties of the cured polymer. Moreover, the dispersion stabilizing component eliminates the need for mixing just prior to use, and ensures the desired qualities of color, surface finish and overall aesthetics.

One particularly desirable set of compositions particularly useful for making hollow shells, such as hearing aids, includes: a (meth)acryl functionalized curable component, such as an aliphatic urethane-acrylate oligomer and/or a polyfunctional (meth)acrylate ester monomer such as a di-, tri- and tetra(ethylene glycol) di(meth)acrylate, used in amounts of about 46.0 to about 74.0% by weight; reactive diluents, such as tri(ethylene glycol) dimethacrylate, hydroxypropyl and hydroxyethyl methacrylate, used in amounts of about 9 to about 30% by weight; photoinitiators such as diphenyl (2,4,6-trimethylbenzol)phosphene oxide, 1,benzoyl cyclohexanol and bis(2,4,6-trimethylbenzoyl) phenyl phosphene oxide, used in amounts of about 0.2 to about 1.20% by weight; pigments, such as $TiO_2$ and $Fe_2O_3$, used in amounts of about 0.6 to about 0.8% by weight; a dispersion stabilizer as described in component (d) above, in amounts of about 0.1 to about 1.0% by weight; and various wetting, defoaming and odor masking agents used in amounts of about 0.04 to about 1.20% by weight.

In another aspect of the invention, there is included a method of making hollow shells which includes the use of the aforementioned composition. The inventive method includes the steps of:

a. pouring into a mold cavity of a mold a photo-curable composition comprising a (meth)acryl functionalized curable matrix component, a photoinitiator, a pigment and a dispersion stabilizer for said pigments, said dispersion stabilizer comprising an alkali metal salt and an additive which is the reaction product of:
   (i) a polyfunctional isocyanate and a member selected from an hydroxy and an amine; or
   (ii) a phosgene or phosgene derivative and a compound having 3 to 7 polyethylene glycol ether units terminated at one end with an ether group and the other end with a reactive functional group selected from an amine, an amide, a thiol and an alcohol; or
   (iii) a monohydroxy compound, a diisocyanate and a polyamine; and
b. exposing said composition to photo-radiation for time and intensity sufficient to cure said composition to a shell having a substantially uniform cross-sectional thickness.

DETAILED DESCRIPTION OF THE INVENTION (Meth)acryl functional components useful in the present invention can be selected from a wide variety of materials. Desirably, the (meth)acryl functionalized component includes a poly(meth)acryl functionalized compound which is capable of crosslinking during cure.

Such monomers may be chosen from any of those commonly used in the art. For example, useful monomers include, without limitation, those corresponding to the following general formula:

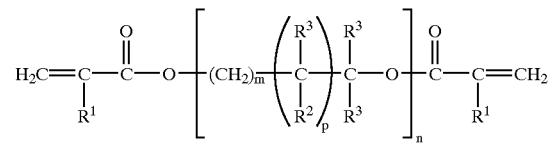

wherein $R^1$ is selected from hydrogen, halogen, and lower alkyl of 1–4 carbon atoms; $R^2$ is selected from the group consisting of hydrogen, —OH and

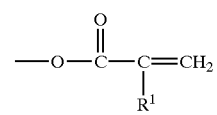

$R^3$ is a radical selected from hydrogen, lower alkyl of 1–4 carbon atoms and hydroxyalkyl of 1–4 carbon atoms; and m is an integer equal to at least 1, desirably from 1–20 and more desirably from 1 to 4; n is an integer equal to at least 1, desirably 1 to 20; and p is 0 or 1.

Typical of these monomers are mono-, di-, tri- tetra- and polyethylene glycol di(meth)acrylate and the corresponding diacrylates; di(pentamethylene glycol) di(meth)acrylate; tetraethylene glycol di(chloroacrylate); diglycerol diacrylate; diglycerol tetra(meth)acrylate; butylene glycol di(meth) acrylate; neopentyl glycol diacrylate; and trimethylpropane triacrylate.

Particularly useful polymerizable crosslinkable components are ethoxylated trimethylolpropane triacrylate, trimethylol propane tri(meth)acrylate, dipentaerythritol monohydroxypentacrylate, pentaerythritol triacrylate, ethoxylated trimethylolpropane triacrylate, 1,6-hexanedioldiacrylate, neopentyl glycoldiacrylate, pentaerythritol tetraacrylate, 1,2-butylene glycoldiacrylate, trimethylopropane ethoxylate tri(meth)acrylate, glycerol propoxylate tri(meth)acrylate, trimethylolpropane tri(meth) acrylate, dipentaerythritol monohydroxy penta(meth) acrylate, tri(propylene glycol) di(meth)acrylate, neopentylglycol propoxylate di(meth)acrylate, 1,4-butanediol di(meth) acrylate, polyethyleneglycol di(meth)acrylate (PEGMA), triethyleneglycol di(meth)acrylate, butylene glycol di(meth) acrylate, ethoxylated bisphenol A di(meth)acrylate and combinations thereof.

Other useful monomers include those acrylates derived from bisphenol-A, such as bisphenol-A di(meth)acrylate, hydrogenated bisphenol-A di(meth)acrylate, and ethoxylated bisphenol-A di(meth)acrylate (EBIPMA).

While di- and other polyacrylate esters are used for producing a cross-linked product, monofunctional acrylate esters (esters containing one acrylate group) also may be additionally incorporated. These materials are often incorporated as reactive diluents which are capable of copolymerizing with the various other polymerizable materials. When dealing with monofunctional acrylate esters, it is desirable to use an ester which has a relatively polar alcoholic moiety. Such materials are less volatile than low molecular weight alkyl esters and, more importantly, the polar group tends to provide intermolecular attraction during and after cure, thus producing more desirable cure properties, as well as a more durable sealant or adhesive. Particularly desirable are the polar groups selected from labile hydrogen, heterocyclic ring, hydroxy, amino, cyano, and halogen polar groups. Useful examples of compounds within this category include cyclohexyl (meth)acrylate, tetrahydrofurfuryl (meth)acrylate, hydroxyethyl acrylate, hydroxypropyl (meth)acrylate, t-butylaminoethyl (meth)acrylate, cyanoethylacrylate, and chloroethyl (meth)acrylate. Other unsaturated reactive diluents, such as styrene and acrylonitrile, can also be used.

It is desirable that aromatic reactive diluents be incorporated into the composition. Useful aromatic-containing reactive diluents include, without limitation, those compounds corresponding to the structure:

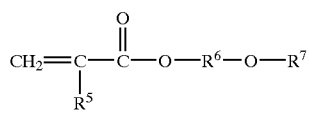

wherein $R^5$ may be H, $CH_3$, $CH_2CH_3$; $R^6$ may be $(CH_2)_n$, and n may be an integer from 1–4; $R^6$ may also be substituted with —OH or halide when n is 2–4; and $R^7$ may be a substituted or unsubstituted aromatic group such as phenyl, benzyl or a fused aromatic ring, such as napthalene, anthracene, and the like. $R^7$ may also be an alkaryl, alkaryloxy or aryloxy group.

Urethane-acrylate curable oligomers are particularly useful in the present invention. For example, these materials can be described as the acrylated reaction product of an aliphatic alcohol, such as a polycarbonate polyol or a polyether polyol, and a polyisocyanate.

Representative polyether polyols useful in preparing the urethane-acrylate oligomers include straight or branched alkylene oxides having from one to twelve carbon atoms ($C_{1-12}$), prepared by methods known in the art. Desirable, the polyether polyols have an average molecular weight, as determined by vapor pressure osmometry (ASTM-D 3592), sufficient to give the entire oligomer a molecular weight of about 6,000 daltons, desirably not more than 5,000 daltons and more desirably not more than 4,000 daltons. Examples include, without limitation; polytetramethylene polyol, polymethylene oxide, polyethylene oxide, polypropylene oxide, polybutylene oxide and combinations thereof.

Representative hydrocarbon polyols used to prepare the urethane-acrylate oligomers also include hydrocarbon polyols, straight or branched, having a molecular weight of from about 600 to 4,000. Non-limiting examples include fully or partially hydrogenated polybutadiene, polybutadiene hydrogenated to an iodine number of from 9 to 21, and fully or partially hydrogenated polyisobutylene.

Representative polycarbonate polyols used to prepare the urethane-acrylate oligomers include but are not limited to the reaction products of dialkyl carbonate with an alkylene diol, optionally copolymerized with alkylene ether diols.

The polyisocyanates used to prepare the urethane-acrylate oligomers include aliphatics and aromatics having from 4 to 20 carbon atoms ($C_{4-20}$). Representative aliphatic examples include isophorone diisocyanate, dicyclohexylmethane-4,4'-diisocyanate, 1,4-tetramethylene diisocyanate, 1,5-pentamethylene diisocyanate, 1,6-hexamethylene diisocyanate, 1,7-heptamethylene diisocyanate, 1,8-octamethylene diisocyanate, 1,9-nonamethylene diisocyanate, 1,10-decamethylene diisocyanate, 2,2,4-trimethyl-1,5-pentamethylene diisocyanate, 2,2'-dimethyl-1,5-pentamethylene diisocyanate, 3-methoxy-1,6-hexamethylene diisocyanate, 3-butoxy-1,6-hexamethylene, omega, omega'-dipropylether diisocyanate, 1,4-cyclohexyl diisocyanate, 4,3-cyclohexyl diisocyanate, trimethylhexylmethylene diisocyanate and combinations thereof.

Suitable catalysts for reacting the polyol with the polyisocyanate to form the urethane portion of the urethane-acrylate oligomers include such materials as: dibutyl tin dilaurate, dibutyl tin oxide, dibutyl tin di-2-hexoate, stannous oleate and octoate, lead octoate, ferrous acetoacetate; and amines, such as triethylamine, diethylmethylamine, triethylenediamine, dimethylethylamine, morpholine, N-ethyl morpholine, piperzine, N,N-dimethyl benzylamine, N,N-dimethyl laurylamine and combinations thereof.

The urethane oligomers thus formed are endcapped with a (meth)acrylate-containing group to form the urethane-acrylate. Suitable hydroxyl-terminated endcapping monomers include, without limitation, hydroxyalkyl (meth) acrylates, such as hydroxyethyl (meth)acrylate, hydroxypropyl (meth)acrylate, hydroxybutyl (meth) acrylate, and the like. Combinations of endcapping groups may be employed.

The molar ratio of the polyol, polysocyanate and endcapping monomer is desirably about 1:2:2, respectively.

Representative commercially available urethane-acrylate oligomers include: Photomer.RTM 6008 from Henkel Corporation, Ambler, Pa. which is an aliphatic urethane acrylate oligomer formed from polyether polyol, dicyclohexyl methane diisocyanate and hydroxyethyl acrylate. The oligomer has a number average molecular weight of about 1,500 daltons and is sold as a solution in tripropylene glycol diacrylate diluent: Photomer.RTM.6019, also from Henkel Corporation, analogous to the above, but based on isophorone diisocyanate rather than dicylohexyl methane diisocyanate; and Photomer.RTM.6010, also from Henkel Corporation, which is an aliphatic urethane-acrylate oligomer formed from polyether polyol, dicyclohexyl methane diisocyanate and hydroxyethyl acrylate in trimethylolpropane triethoxy triacrylate diluent. It has a number average molecular weight of about 1,500 daltons.

Other useful commercially available urethane-acrylate oligomers include Sartomer CN980, CN981, CN983 and Sartomer CN985, Sartomer Company, Exton, Pa.; and Echo Resins ALU-350 series, which are polytetramethylene polyol-based acrylated aliphatic urethane oligomers. Other useful oligimers are set forth in U.S. Pat. No. 5,908,873, which is incorporated therein by reference.

The (meth)acryl functionalized component of the present invention may be employed in amounts of about 30 to about 97%, desirably about 80 to about 97%, more desirably about 90 to about 97% and even more desirably in amounts of about 95 to about 97% by weight of the total composition.

In applications where hollow shells are to be made, the cure system is desirably one which is initiated by electromagnetic radiation. Photoradiation is most desirable for its ability to produce a well-controlled cure and high quality parts efficiently. Various photoinitiators, such as UV, visible and infrared may be employed.

Most desirably are the UV photoinitators. These photoiniators are generally effective in the 200 to 450 mm range, and particularly in the portion of the ultraviolet spectrum which borders on the invisible light and the visible portion just beyond this, e.g. >200 mm to about 390 mm.

A variety of UV photoinitiators may be employed. Photoinitiators, those that will respond to UV radiation to initiate and induce curing of the (meth)acryl functionalized curable component, which are useful in the present invention include benzophenone and substituted benzophenones, acetophenone and substituted acetophenones, benzoin and its alkyl esters, xanthone and substituted xanthones, diethoxy-acetophenone, benzoin methyl ether, benzoin ethyl ether, benzoin isopropyl ether, diethoxyxanthone, chloro-thio-xanthone, N-methyl diethanol-amine-benzophenone, 2-hydroxy-2-methyl-1-phenyl-propan-1-one, 2-benzyl-2-(dimethylamino)-1-[4-(4-morpholinyl)phenyl]-1-butanone and mixtures thereof. Photoinitiators suitable for use in the present invention that will respond to visible light to initiate and induce curing include camphoroquinone peroxyester initiators and 9-fluorene carboxylic acid peroxyesters. Thermal initiators include 2,2'-azobisisobutyronitrile. The initiators set forth above are for the purposes of illustration only and are in no way meant to limit the initiators that may be used in the present invention.

Among the more desirable UV photoinitiators are 1-hydroxycyclohexyl phenyl ketone (sold under the tradename Irgacure 184, Ciba Specialty Chemicals, Terrytown, N.Y.), diphenyl (2,4,6-tri(methylbenzoyl) phosphine oxide and bis(2,4,6-trimethylbenzoyl)phosphine oxide (Irgacure 819, Ciba Specality Chemicals). It has been found that a combination of these photoinitiators produce particularly good results in highly pigmented compositions, such as the colored hearing aid products of the present invention.

Photoinitiators may be employed in amounts of about 0.01% to about 10% and desirably about 0.25% to about 1.0% by weight of the total composition.

The compositions of the present invention may also employ other or additional free radical components. For example, the inventive compositions may be anaerobically cured by employing peroxy free radical initiators conventional to such cure mechanisms. In such cases, accelerators are often employed to enhance the speed at which the peroxy free radical is generated. Reducing agents for the initiator, such as saccharin, may also be employed.

Free radical initiators such as peroxy, perester and peracid compounds may also be employed. Illustrative of peroxy initiators are the diacyl peroxides such as benzoyl peroxide; dialkyl peroxides such as di-tert-butyl peroxide; ketone peroxides such as methylethyl ketone peroxide; and peresters which readily hydrolyze, e.g., tert-butyl peracetate, tert-butyl perbenzoate and di-tert-butyl diperphthalate. A particularly useful class of peroxy initiators are the organic hydroperoxides such as cumene hydroperoxide (CHP), methylethyl ketone hydroperoxide and tert-butyl hydroperoxide (TBH). Of these, cumene hydroperoxide is especially desirable. These initiators may be used in amounts of about 0.01% to about 10% by weight of the total composition, and desirably in amounts of about 0.1% to about 3% by weight of the total composition. Another useful class of initiators includes carbonyl-containing ultraviolet-activated free-radical generators, such as acetophenones, benzophenones and the benzoin ethers. Initiator combinations may also be employed.

Useful accelerators for the present invention include compounds having the following formula:

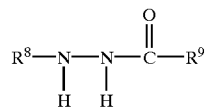

where $R^8$ is selected from alkyl from 2 to 6 carbon atoms, cycloalkyl, aryl, alkenyl, and cycloalkenyl and $R^9$ is selected from hydrogen, alkyl, cycloalkyl, alkenyl and cycloalkenyl, aryl, alkoxy, aryloxy, carbonyl, amino, and the following groups:

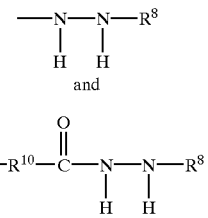

where $R^{10}$ is selected from alkyl groups containing one to about 10 carbon atoms, alkenyl groups containing two to about 10 carbon atoms, and aryl groups containing up to about 10 carbon atoms. Examples of useful accelerator compounds include 1-acetyl-2-phenyl hydrazine, 1-acetyl-2 (p-tolyl) para-toluene sulfonyl hydrazide, 1-formyl-2-phenyl hydrazine and combinations thereof.

Stabilizers and inhibitors may also be employed as well as chelating agents to control and prevent premature peroxide decomposition and polymerization. Among those useful inhibitors include phenols such as hydroquinone and quinones. Chelating agents may be used to remove trace amounts of metal contaminants. An example of a useful chelating agent is the tetrasodium salt of ethylenediamine tetraacetic acid (EDTA).

Other agents such as thickeners, plasticizers, fillers, elastomers, thermoplastics, and other well-known additives may be incorporated where functionally desirable.

Various colorants can be included in the inventive compositions. The term "colorants" is used to include dyes, pigments and other materials which can be used to impart color to the composition. Dyes are generally water-soluble organics, which often become water-insoluble once cured. Pigments may be organic or inorganic materials and are generally in the solid form. In particular, the compositions of the present invention are designed to work particularly well with the more dense solid pigments which are available. These pigments, due to their density and insolubility, tend to drop out of the dispersion and form a sediment in compositions to which they are added. The present invention is designed to overcome this sedimentation tendency, keep such dense insolubles in dispersion for a longer period of time and provide for color homogeneity to be re-established without substantial mixing.

Examples of useful pigments, include without limitation, white pigments, such as titanium oxide, zinc phosphate, zinc sulfide, zinc oxide and lithopone; red and red-orange pigments, such as iron oxide (maroon, red, light red), iron/chrome oxide, cadmium sulfoselenide and cadmium mercury (maroon, red, orange), ultramarine (blue, pink & violet), chrome-tin (pink) manganese (violet), cobalt (violet); orange, yellow and buff pigments such as barium titanate; cadmium sulfide (yellow), chrome (orange, yellow), molybdate (orange), zinc chromate (yellow), nickel titanate (yellow), iron oxide (yellow), nickel tungsten titanium, zinc ferrite and chrome titanate; brown pigments such as iron oxide (buff, brown), manganese/antimony/titanium oxide; manganese titanate, natural siennas (umbers), titanium tungsten manganese; blue-green pigments, such as chrome aluminate (blue), chrome cobolt-alumina (turquoise), iron blue (blue), manganese (blue), chrome and chrome oxide (green) and titanium green; as well as black pigments, such as iron oxide black and carbon black.

Combinations of pigments are generally used to achieve the desired color tone in the cured composition. Titanium and iron oxides in combination, are particularly useful in creating flesh tones for hearing aids.

The colorants may be present in the present invention in amounts sufficient to render the desired color. Desirably, colorants may be present in amounts of about 0.1 to about 10.0%, desirably about 0.2 to about 2.0% and more desirably in amounts of about 0.2 to about 0.6% by weight of the total composition. Insoluble pigments are the desired form of colorant useful in the present invention.

In addition to a curable component, a cure system and a pigment composition, the present invention includes an additive (d), which serves as a dispersion stabilizer and aids in control of the rheology of the composition. As previously stated, this additive includes a combination of an alkali metal cation and the reaction product of (i) a polyfunctional isocyanate and a member selected from the group consisting of an hydroxy and an amine; or (ii) a phosgene or phosgene derivative, and a compound having 3 to 7 polyethylene ether units terminated at one end with an ether group and at the other end with a reactive functional group selected from the group consisting of an amine, an amide, a thiol and an alcohol; or (iii) a monohydroxy compound, a diisocyanate and a polyamine. When the reaction product described in (iii) is employed, it is generally formed by first reacting a monohydroxy compound with a diisocyanate to form a mono-isocyanate adduct, and subsequently reacting the mono-isocyanate reaction product with a polyamine in the presence of an alkali metal salt and aprotic solvent, as described in U.S. Pat. No. 4,314,924, the disclosure of which is hereby expressly incorporated herein by reference. A commercially available version of the reaction product described in (iii) is believed to be BYK-410, from BYK-Chemie, Wallingford, Conn. BYK-Chemie describes this reaction product as a urea urethane.

Useful isocyanates for forming the reaction product(s) of the dispersion stabilizing additive include polyisocyanates such as phenyl diisocyanate, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclo-hexylmethane diisocyanate, 1,3-bis-(isocyanatomethyl) cyclohexane, cyclohexylene diisocyanate, tetrachlorophenylene diisocyanate, 2,6-diethyl-p-phenylenediisocyanate, and 3,5-diethyl-4,4'-diisocyanatodiphenylmethane. Still other polyisocyanates that may be used are polyisocyanates obtained by reacting polyamines containing terminal, primary and secondary amine groups or polyhydric alcohols, for example, the alkane, cycloalkane, alkene and cycloalkane polyols such as glycerol, ethylene glycol, bisphenol-A, 4,4'-dihydroxyphenyldimethylmethane-substituted bisphenol-A, and the like, with an excess of any of the above-described isocyanates.

Useful alcohols for reacting with the polyisocyanates used to form the additive (iii) also include polyethyl glycol ethers having 3–7 ethylene oxide repeating units and one end terminated with an ether or an ester, polyether alcohols, polyester alcohols, as well as alcohols based on polybutadiene. The specific type of alcohol chosen and the molecular weight range can be varied to achieve the desired effect. Generally, monohydroxy compounds, straight or branched chain aliphatic or cyclic primary or secondary alcohols containing $C_{5-25}$, and alkoxylated derivatives of these monohydroxy compounds are useful.

Phosgene and phosgene derivatives, such as bischloroformates, may be used to make the reaction product of the additive (iii). These compounds are reacted with a nitrogen-containing compound, such as an amine, an amide or a thiol to form the adduct. Phosgenes and phosgene derivatives may also be reacted with an alcohol to form the reaction product.

Amines which can be reacted with phosgenes or phosgene derivatives to make the reaction product of the additive (iii) include those which conform to the general formula $R^{11}$—$NH_2$, where $R^{11}$ is aliphatic or aromatic. Desirable aliphatic amines include polyethylene glycol ether amines. Desirable aromatic amines include those having polyethylene glycol ether substitution on the aromatic ring.

For example, commercially available amines sold under the tradename JEFFAMINE by Huntsman Corporation, Houston, Tex., may be employed. Examples include JEFFAMINE D-230, JEFFAMINE D-400, JEFFAMINE D-2000, JEFFAMINE T-403, JEFFAMINE ED-600, JEFFAMINE ED-900, JEFFAMINE ED-2001, JEFFAMINE EDR-148, JEFFAMINE XTJ-509, JEFFAMINE T-3000, JEFFAMINE T-5000, and combinations thereof.

The JEFFAMINE D series are diamine based products and may be represented by:

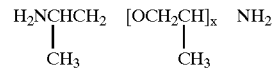

(CAS Registry No. 904610-0)

where x is about 2.6 (for JEFFAMINE D-230), 5.6 (for JEFFAMINE D-400) and 33.1 (for JEFFAMINE D-2000), respectively.

The JEFFAMINE T series are trifunctional amine products based on propylene oxide and may be represented by:

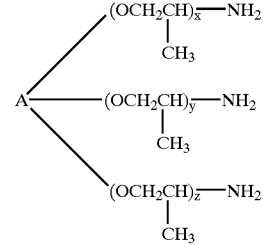

where x, y and z are set forth below in Table A.

TABLE A

| JEFFAMINE | | Approx. | Mole |
|---|---|---|---|
| Product | Initiator (A) | Mol. Wt. | PO |
| T-403 | Trimethylolpropane | 440 | 5–6 |
| T-3000 | Glycerine | 3,000 | 50 |
| T-5000 | Glycerine | 5,000 | 85 |

More specifically, the JEFFAMINE T-403 product is a trifunctional amine and may be represented by:

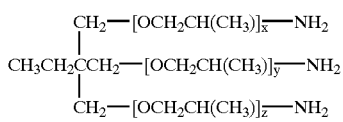

where x+y+z is 5.3.

(CAS Registry No. 39423-51-3)

The JEFFAMINE ED series are polyether diamine-based products and may be represented by:

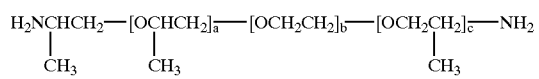

where a, b and c are set forth below in Table B.

TABLE B

| JEFFAMINE Product | Approx. Value B | a + c | Approx. Mol. Wt. |
|---|---|---|---|
| ED-600 | 8.5 | 2.5 | 600 |
| ED-900 | 15.5 | 2.5 | 900 |
| ED-2001 | 40.5 | 2.5 | 2,000 |

Amides useful for reacting with the phosgene or phosgene derivatives include those which correspond to the following formula:

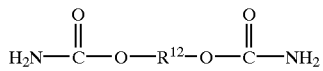

where $R^{12}$ may be an aliphatic or aromatic, substituted or unsubstituted, hydrocarbon or heterohydrocarbon, substituted or unsubstituted, having $C_{1-36}$.

Alcohols useful in forming the reaction product with the phosgene or phosgene derivatives include those described above.

The alkali metal cations are usually provided in the form of a halide salt. For example, sodium, potassium and lithium halide salts are useful. In particular, sodium chloride, sodium iodide, sodium bromide, potassium chloride, potassium iodide, potassium bromide, lithium chloride, lithium iodide, lithium bromide and combinations thereof may be employed.

The reaction products of additive (iii) of the present invention are usually present in and added to the composition with an alkali metal salt, in a solvent carrier. The solvents are desirably polar aprotic solvents in which the reaction to form the reaction product was carried out. For example, N-methyl pyrrolidone, dimethylsulfoxide, hexamethylphosphoric acid triamide, N,N-dimethylformamide, N,N,N',N'-tetramethylurea, N,Ndimethylacetamide, N-butylpyrrolidone, tetrahydrofuran and diethylether may be employed.

One particularly desirable additive is the combination of a lithium salt and a reaction product which is formed by reacting a monohydroxy compound with a diisocyanate compound to form a mono-isocyanate first adduct, which is subsequently reacted with a polyamine in the presence of lithium chloride and 1-methy-2-pyrrolidone to form a second adduct. A commercially available additive of this sort is sold by BYK Chemie, Wallingford, Conn. under the trade name BYK 410. This commercially available additive is described by BYK-Chemie product literature as being a urea urethane having a minor amount of lithium chloride present in a 1-methyl-2 pyrrolidone solvent.

Desirably, the dispersion stabilizing additive is present in the inventive compositions in amounts of about 0.1% to about 2.0% and more desirably in amounts of about 0.5% to about 0.7% by weight of the total composition.

It is believed that the dispersion stabilizing component, when combined with the dispersed pigments in the inventive compositions, provides a unique mechanism for maintaining the pigments in dispersion. These combinations of components are responsible for the ability to maintain the uniformity of color during storage and eliminate the need for substantial mixing prior to use. In some instances, uniformity of the dispersion during storage may be slightly altered. In such instances, uniform dispersion of the colorant can be immediately returned by slight shaking and without a separate mixing step. Thus, the combination of components provides a sufficient "network" or "structure" which is storage stable and which maintains the suspension of the pigments in the curable composition.

The viscosities of the inventive composition can thus be formulated to be in a controlled range. Desirable ranges include Brookfield 500 to about 2,000 cps, as measured at 25° C., RTV spindle #3, at 20 RPM for relatively low viscosity applications. High viscosities are desirable in applications such as patching or repairing hearing aid shells, or for forming hearing aid vent channels. In such cases, viscosities on the order of 5,000 to 10,000 cps Brookfield, as measured at 25° C., RTV spindle #3 at 20 RPMs are useful. Desirably, the final compositions used to make molded articles are easily pourable at room temperature to facilitate the manufacturing process. Moreover, many manufacturing techniques used in the hearing aid industry include dispensing the curable composition using syringe-like dispensing devices. The overall rheology of the compositions, therefore, must be suitable for these dispensers. As the material is dispensed, the natural flow of the composition further prevents any settling of the pigments. However, the "network" produced by the unique combination of the inventive components may be temporarily interrupted in this process. Nonetheless, once the composition has been deposited in the mold cavity, it regains its internal "structure" which serves to maintain the pigment in dispersion.

The process of making the hollow shells includes pouring the curable composition into the mold cavity of a light-penetrable mold, the mold having an exposed, generally upward-facing surface. The composition covers a major amount of the generally upward-facing surface and fills the majority of the cavity. The surface was then exposed to ultra-violet radiation through the transparent mold surface to achieve a thin layer of cured composition having the shape of the cavity surface. Above the cured material remained uncured composition, which was then poured off to leave the cured shell. Depth of thickness of the shell was controlled using a combination of UV initiators, light intensity and time. Additional cure of the shell, if necessary, could also be achieved by exposing the shell to additional photoradiation from the open end of the cavity once the uncured liquid is removed.

The resulting shells are self-supporting, free from surface blemishes and uniform in color. They can be pigmented to match a variety of skin tones and are ideally suited for housing for hearing and components.

Other materials such as wetting agents, defoaming agents, odor masking agents, chelating agents, viscosity modifiers, stabilizers and combinations thereof.

The following examples are intended to be non-limiting illustrations of compositions of the present invention.

EXAMPLES

The following Compositions A–C representive of the present invention, and Composition D (control) were prepared by admixing each of the compositions to form a uniform color suitable for a molded hearing aid shell.

TABLE I (% weight)

| COMPONENT | COMPOSITION | | | |
|---|---|---|---|---|
| | A | B | C | D (Control) |
| (meth)acryl functionalized curable component | 98.20 | 68.81[1] | 50.92 | 51.52 |
| reactive diluents | | 29.00[2] | 46.18[2] | 46.18 |
| UV photoinitiator | 0.50 | 1.00 | 1.0 | 1.0 |
| pigment(s)[3] | 0.60 | 0.60 | 0.6 | 0.6 |
| dispersion stabilizer[4] | 0.70 | 0.30 | 0.7 | 0.7 |
| odor maskers, chelators, wetting & defoaming agents | 0.60 | 0.60 | 0.6 | — |
| color | pink | cocoa | brown | brown |
| Brookfield viscosity (25° C., CP) | 1500 | 7500 | 500 | 500 |

[1]aliphatic urethane-acrylate oligomer (Henkel, Photomer RTM.6008)
[2]One or more of tri(ethylene glycol) dimethacrylate, hydroxyethyl methacrylate and hydroxypropyl methacrylate.
[3]Pigment dispersions of $TiO_2$ and $Fe_2O_3$
[4]Urea urethane and lithium chloride in 1-methyl-2-pyrrolidone solvent (BYK-410; BYK-Chemie, Wallingford, CT.)

Each of the inventive compositions A–C were prepared by uniformly mixing each of the components. The pigments were previously made into a premixed dispersion using a portion of curable components for ease of handling and to faciliate incorporation into the total composition.

The compositions were then poured into the molded cavities of a hearing aid shell. The mold cavity was light-penetratable. The molds had a generally upward-facing surface and the compositions were poured into the cavity until the cavity surface was covered and a major amount of the cavity volume was filled. The compositions were exposed to UV light through the transparent mold surface. The lower viscosity compositions were exposed to a 400-W metal halide lamp at 30 nW/cm² measured at 365 mm. The higher viscosity composition was exposed to a 50-W metal halide flexible want system. Generally, in hearing aid shell applications the UV exposure is in the range of about 10 to about 50 mW/cm².

The exposed surfaces cured and the uncured liquid on top of the cured surface was poured out of the mold. The thickness of the shells were substantially uniform throughout, measured about 0.03 inches thick, and were free of visible air bubbles. In general, thicknesses of about 0.01 to about 0.050 inches are acceptable and can be accomplished with the present invention.

Samples of the cured compositions were also permitted to sit for several days. In each of the compositions, the uniformity of color had been visually disrupted. The inventive compositions were significantly less affected upon visual inspection than the control, which suffered from agglomeration. After simple shaking of the inventive compositions, A–C, for a few seconds, the original homogenous color returned. The control composition D without the dispersion stabilizer had most of its pigment settled and could not be returned to its original color uniformity upon shaking. Automated mixing at high speeds were required to re-disperse the pigment in composition D to achieve the homogenous color required. It is of note that even at low viscosities, such as those shown, where dense pigment particles would naturally settle out relative quickly, the inventive compositions exhibited less color change, i.e., substantially less pigment settling over time and little or no agglomeration, as compared to the control. Moreover, the color of the inventive compositions was returned using simple shaking, which re-established the dispersion rapidly. Once re-established, the dispersion remained stable for several days. This aspect of the inventive is of particular significance on the assembly line, where significant time and cost can be saved by omitting the necessity for mixing just prior to using the pigment, curable compositions.

The examples set forth above serve to illustrate the present invention, but are in no way intended to limit the spirit and scope thereof, which defined by the claims.

What is claimed is:
1. A curable composition comprising:
   a. a (meth)acryl functionalized curable component;
   b. a cure system for said curable component;
   c. a pigment composition comprising at least one pigment dispersed within said curable component; and
   d. an additive which comprises an alkali metal cation and the reaction product of:
      (i) a polyfunctional isocyanate and a member selected from the group consisting of a hydroxy and an amine; or
      (ii) a phosgene or phosgene derivative, and a compound having 3 to 7 polyethylene ether units terminated at one end with an ether group and at the other end with a reactive functional group selected from the group consisting of an amine, an amide, a thiol and an alcohol; or
      (iii) a monohydroxy compound, a diisocyanate and a polyamine.
2. The composition of claim 1, wherein said cure system comprises a photoinitiator.
3. The composition of claim 1, wherein said curable component comprises a aliphatic urethane-acrylate oligomer.
4. The composition of claim 1, wherein said additive is in a solvent or dispersion.
5. The composition of claim 4, wherein said solvent is selected from the group consisting of 1-methyl-2-pyrrolidone, tetrahydrofuran, diethylether and combinations thereof.
6. The composition of claim 1, wherein said additive is the reaction product of a polyisocyanate and a member selected from the group consisting of an alkylalkenyloxy alcohol, an amine, acid-terminated polyethylene glycol ethers and combinations thereof.
7. The composition of claim 1, wherein said polyfunctional isocyanate is selected from the group consisting of toluene diisocyanate, 4,4'-diphenyl diisocyanate, 4,4'-diphenylene diisocyanate, phenyl diisocyanate, methylene diisocyanate and combinations thereof.
8. The composition of claim 1, wherein said composition has a Brookfield viscosity, 25° C., RVT spindle #3, and 20 RPM of about 500 to about 10,000 CP.
9. The composition of claim 1, wherein said pigment composition includes organic and inorganic pigments, dyes and combinations thereof.
10. The composition of claim 8, wherein said pigment composition is plasticized in a carrier.
11. The composition of claim 1, further including one or more reactive diluents.

12. The composition of claim 1, further including a material selected from the group consisting of wetting agents, defoaming agents, odor masking agents, chelating agents, viscosity modifiers and combinations thereof.

13. The composition of claim 1, wherein said curable component is present in amount of about 30% to about 97% by weight of the total composition.

14. The composition of claim 1, wherein said additive is present in amounts of about 0.1% to about 2.0% by weight of the total composition.

15. The composition of claim 1, wherein said (meth)acryl functionalized curable component is a urethane-acrylate oligomer comprising the reaction product of a polyether polyol, dicyclohexylmethane diiscyanate, and hydroxyethyl methacrylate in a solution of tri(propylene glycol) diacrylate diluent.

16. A flowable composition useful for the manufacture of hollow shells comprising:
 (a) a photocurable urethane-acrylate oligomer composition having dispersed therein a pigment and a dispersion stabilizer, said stabilizer comprising a metal salt and the reaction product of
  (i) a polyfunctional isocyanate and a member selected from the group consisting of a hydroxy and an amine; or
  (ii) a phosgene or phosgene derivative, and a compound having 3 to 7 polyethylene ether units terminated at one end with an ether group and at the other end with a reactive functional group selected from the group consisting of an amine, an amide, a thiol and an alcohol; or
  (iii) a monohydroxy compound, a diisocyanate and a polyamine; and
 (b). a photoinitiator.

17. The composition of claim 16, wherein said stabilizer includes a metal salt selected from the group consisting of lithium, sodium and potassium.

18. The composition of claim 16, wherein said stabilizer is formed by reacting a monohydroxy compound with a diisocyanate and subsequently reacting the product thus formed with a polyamine in the presence of an alkali metal salt.

19. The composition of claim 16, wherein said stabilizer is present in amounts of about 0.1% to about 2.0% by weight of the total composition.

20. The composition of claim 16, further including one or more reactive diluents.

21. The composition of claim 16, wherein said composition has a Brookfield viscosity of about 500 to about 10,000 cps at 25° C.

22. A method of making hollow shells comprising a photo-cured polymer, comprising the steps of:
 (a) pouring into a the mold cavity of a mold a photo-curable composition comprising a (meth)acryl funtionalized curable component, a photoinitiator, a pigment and a dispersion stabilizer for said pigment, said dispersion stabilzer stabilizer comprising a metal salt and an adduct which is the reaction product of
  (i) a polyfunctional isocyanate and a member selected from the group consisting of a hydroxy and an amine; or
  (ii) a phosgene or phosgene derivative, and a compound having 3 to 7 polyethylene ether units terminated at one end with an ether group and at the other end with a reactive functional group selected from the group consisting of an amine, an amide, a thiol and an alcohol; or
  (iii) a monohydroxy compound, a diisocyanate and a polyamine; and
 (b) exposing said composition to photo-radiation for a time and intensity sufficient to cure said composition to a shell having a substantially uniform cross-sectional thickness.

23. The method of claim 22, wherein said viscosity of said composition is about 1,000, to about 10,000 cps at 25° C.

24. The method of claim 22, wherein said photo-curable composition comprises an aliphatic urethane-acrylate oligomer.

25. The method of claim 23, wherein said curable component is present in amounts of about 30% to about 97% by weight of the total composition.

26. The method of claim 22, wherein the intensity of photo-radiation is about 10 to about 50 mW/cm$^2$.

27. The method of claim 22, wherein the cure-through thickness is about 0.010 to about 0.050 inches.

* * * * *

UNITED STATES PATENT AND TRADEMARK OFFICE
CERTIFICATE OF CORRECTION

PATENT NO. : 6,503,960 B1
DATED : January 7, 2003
INVENTOR(S) : Kadziela et al.

It is certified that error appears in the above-identified patent and that said Letters Patent is hereby corrected as shown below:

Column 1,
Line 19, "...been use for the..."; should read -- ...been used for the... --.
Line 34, "...and a photoiniator. This..."; should read -- ...and a photoinitiator. This... --.

Column 2,
Line 55, "...as a matrix,..."; should read -- ...as a matrix;... --.

Column 3,
Line 19, "...b. a photoiniator...."; should read -- ...b. a photoinitiator... --.

Column 5,
Line 48, "...in the art. Desirable,..."; should read -- ...in the art. Desirably,... --.

Column 6,
Line 32, "...polyol, polysocyanate and ..."; should read -- ...polyol, polyisocyanate and ... --.

Column 11,
Line 65, "...and 1-methy-2-pyrrolidone ..."; should read -- ...and 1-methyl-2-pyrrolidone... --.

Column 12,
Line 64, "...hearing and components."; should read -- ...hearing aid components. --.

Column 14,
Line 11, "...of the inventive is..."; should read -- ...of the invention is ... --.
Line 40, "...comprises a aliphatic..."; should read -- ...comprises an aliphatic... --.

Column 15,
Line 14, "...diiscyanate, and..."; should read -- diisocyanate, and... --.

UNITED STATES PATENT AND TRADEMARK OFFICE
CERTIFICATE OF CORRECTION

PATENT NO. : 6,503,960 B1
DATED : January 7, 2003
INVENTOR(S) : Kadziela et al.

It is certified that error appears in the above-identified patent and that said Letters Patent is hereby corrected as shown below:

Column 16,
Line 9, "...pouring into a the mold..."; should read -- ...pouring into the mold... --.
Line 13, "...dispersion stabilizer stabilizer..."; should read -- ...dispersion stabilizer... --.

Signed and Sealed this

Twenty-second Day of July, 2003

JAMES E. ROGAN
*Director of the United States Patent and Trademark Office*